UNITED STATES PATENT OFFICE.

CHARLES JAMES EAMES, OF NEW YORK, N. Y.

IMPROVED COMPOUND FOR COATING SHIPS' BOTTOMS, &c.

Specification forming part of Letters Patent No. 59,568, dated November 13, 1866.

*To all whom it may concern:*

Be it known that I, CHARLES JAMES EAMES, of the city, county, and State of New York, have invented a new and Improved Compound for Coating Ships' Bottoms, &c.; and I do hereby declare that the following is a full, clear, and exact description thereof, which will enable others skilled in the art to make and use the same.

This invention relates to a composition which is known as "Eames' Compound Paint," and which is particularly intended for coating ships' bottoms, but which can be used for coating wood-work or iron of any description which may be exposed to the action of salt or fresh water, and which is liable to become foul or perforated by worms, said composition being intended to prevent the growth of vegetable matter, marine shells, and worms in the bottom of wooden or iron vessels, and on all wood or iron substances exposed to the action of salt or fresh water.

This composition is made of asphaltum, naphtha, carbolic acid of ninety-five per cent. purity, red oxide of mercury, and white arsenic, and these ingredients are mixed together in about the following proportion: asphaltum, seven pounds; naphtha, four pounds; carbolic acid, ninety-five per cent. purity, three-fourths pound; white arsenic, one-fourth pound; red oxide of mercury, two ounces.

I take the requisite quantity of asphaltum, heat the same until it is melted, then I add enough naphtha to give to the mixture the consistency of paint when cool. After this mixture has become cool I add a preparation of the remaining ingredients, which are mixed together and ground to the consistency of paint, and then mixed or added to the other mixture. The preparation thus obtained I stir into the first mixture, and when both are thoroughly mixed the composition is ready for use.

Having thus described my invention, I claim as new and desire to secure by Letters Patent—

A compound made of the ingredients herein named, for the purpose described, substantially as specified.

CHARLES J. EAMES.

Witnesses:
WM. F. MCNAMARA,
W. HAUFF.